Figure 1:
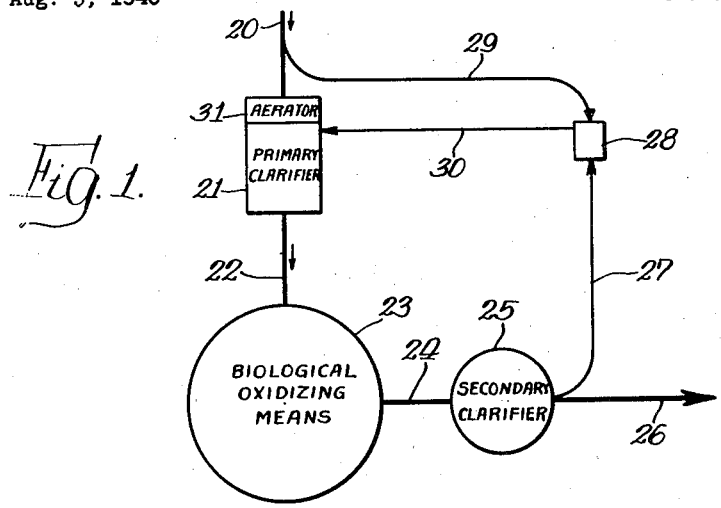

July 31, 1951 — H. E. SCHLENZ — 2,562,510
PROCESS FOR SEWAGE TREATMENT
Filed Aug. 3, 1945 — 4 Sheets-Sheet 1

INVENTOR.
Harry E. Schlenz
BY Fidler & Crouse
Attys

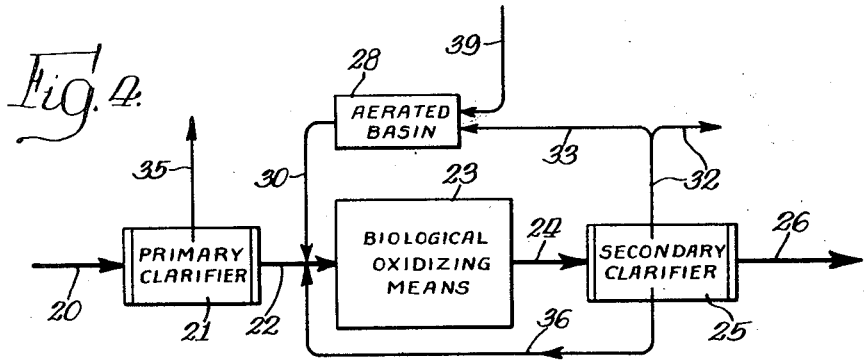
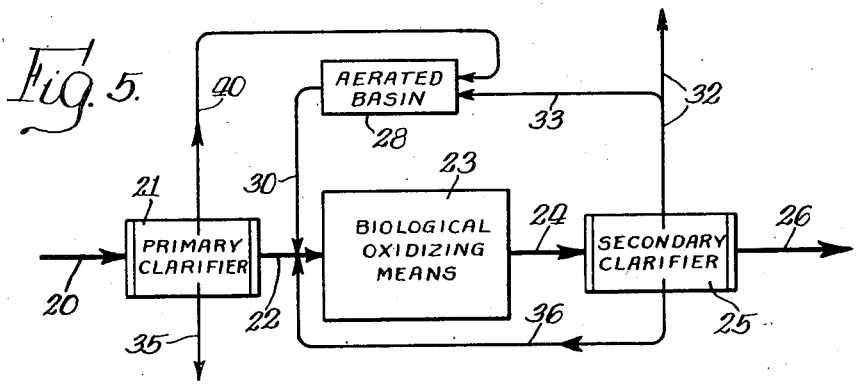
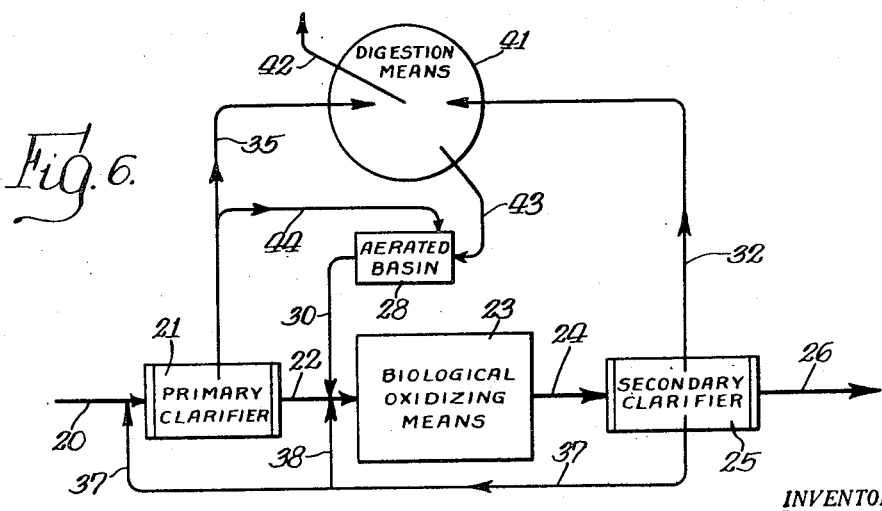

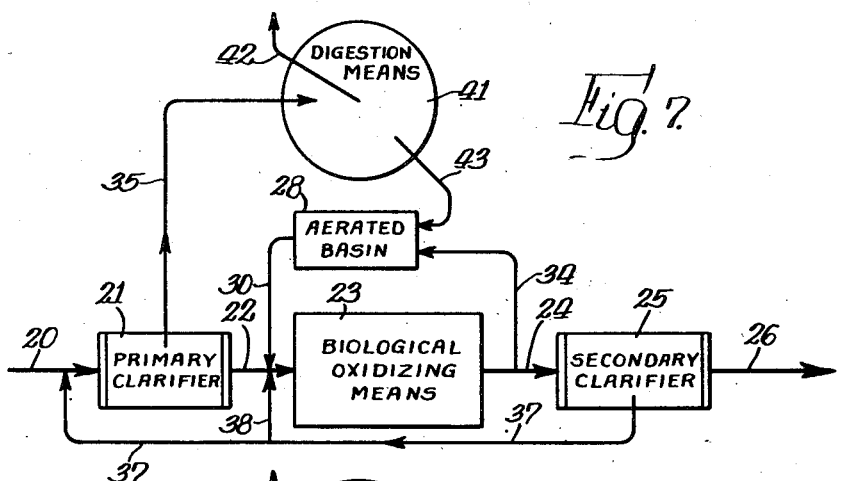
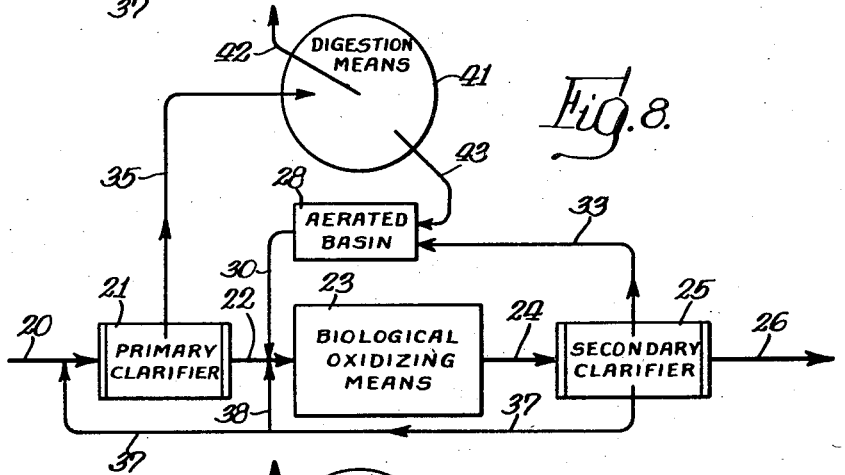
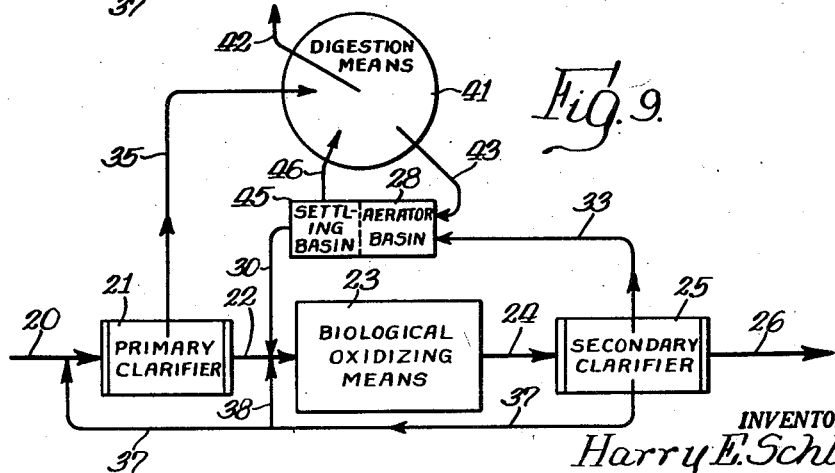

July 31, 1951 H. E. SCHLENZ 2,562,510
PROCESS FOR SEWAGE TREATMENT
Filed Aug. 3, 1945 4 Sheets-Sheet 4
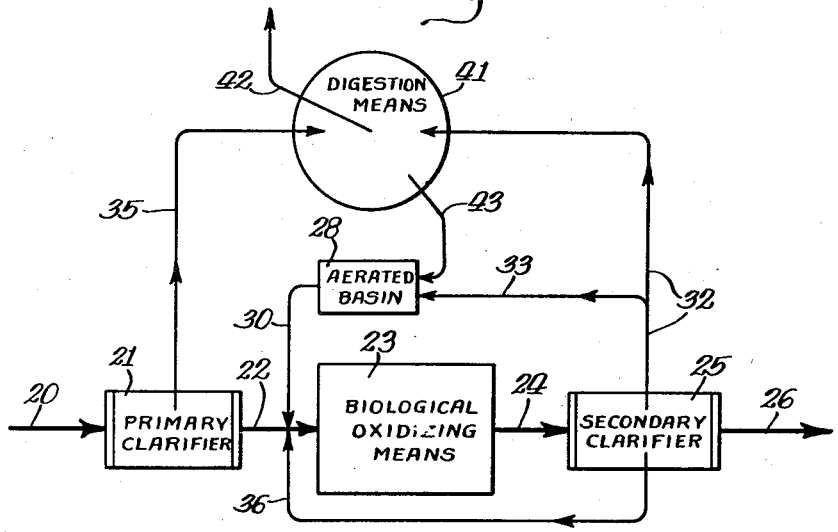
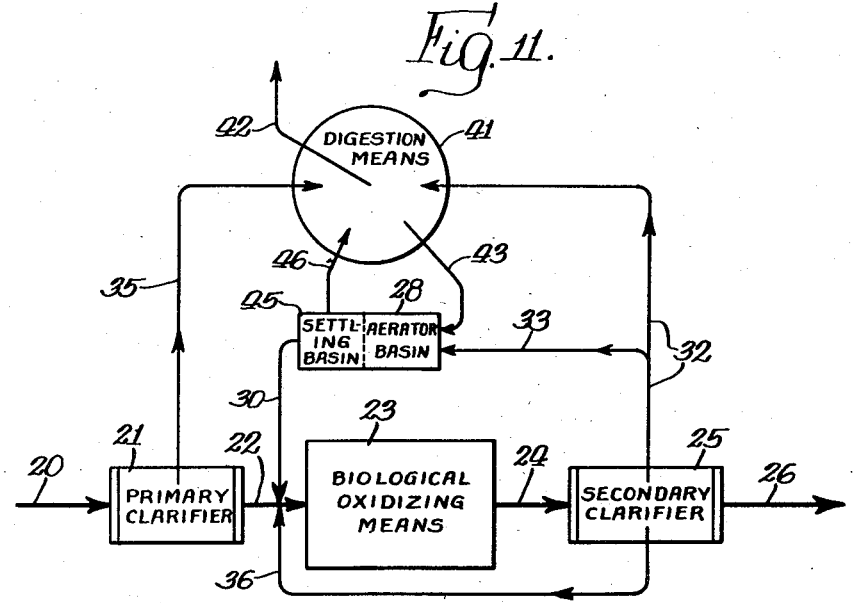
INVENTOR.
*Harry E. Schlenz,*
BY
*Fidler + Crouse*
Attys.

UNITED STATES PATENT OFFICE 2,562,510

PROCESS FOR SEWAGE TREATMENT

Harry E. Schlenz, Glencoe, Ill., assignor to Pacific Flush Tank Company, Chicago, Ill., a corporation of Illinois Application August 3, 1945, Serial No. 608,789

8 Claims. (Cl. 210—7)

This invention relates to improvements in processes and systems for the treatment of sewage containing putrescible substances from domestic, industrial or other sources or combinations of sources. Such sewage is composed of water in which both organic and inorganic matter is present in solution, in suspension or as colloids and contains a large amount of nitrogenous matter including vegetable and animal proteins, free ammonia and possibly some nitrites and nitrates. In the processing of such wastes, the main treatment is directed toward the conversion of as much as possible of the organic and ammonia nitrogen into nitrates through biological or biochemical oxidation whereby the putrefactive properties of the original material are reduced or substantially eliminated and stability is imparted to the effluent.

According to basic known sewage treatment methods, the easily settled materials in the incoming sewage may first be separated in a detention basin, settling tank or primary clarifier from which they are passed to a digesting means. The liquid portion is passed to a biological oxidizing means. Solids capable of being separated from the effluent from the latter means are sparated in a secondary clarifier and also passed to the digesting means. The nitrogenous matter in the sludge in the digesting means is allowed to putrefy in a controlled manner in the absence of oxygen and forms simpler compounds comprising mainly ammonia, ammonium salts, the simpler organic acids, and gases such as methane and carbon dioxide. Sludge from the digesting means is passed to a point of disposal whereas the liquor from the digesting means which is of comparatively large volume and of high ammonia nitrogen content and also contains organic nitrogen is returned for retreatment in the biological oridizing means.

Heretofore, in connection with such bilogical processes, it has been the practice to return effluent from the secondary clarifier to a point ahead of the biological oxidation means or ahead of the primary clarifier. Nitrifying organisms were thus returned to the system ahead of the biological oxidizing means but in such a state of dilution and weakened condition that recirculation in that manner of a large portion of the flow was required to obtain any substantial advantage therefrom. That is expensive not only because of large pumpage requirements but also because of the larger capacities required in the various treatment units of the system to afford the necessary detention time for proper treatment.

It is an object of my present invention to effect economies in the treatment of sewage by effecting reduction in the amount of recirculated material and thus reducing pumpage and reducing the necessary capacities of the treatment units.

A further object of my invention is to increase the degree and/or rapidity of stabilization of sewage.

Another object of my invention is to effect advantageous disposal of supernatant liquor from sawage sludge digesting means in such manner that such liquor, instead of being detrimental to the operation of a biological oxidation process as heretofore, is beneficially utilized in increasing the degree and rapidity of treatment of the sewage.

Preferred embodiments of my invention are hereinafter described with reference to the accompanying drawings in which:

Figure 1 schematically illustrates the broad basis principle of my invention; and Figures 2 to 11 are flow diagrams illustrating sewage treating systems embodying my invention.

In the several drawings, like elements are designated by the same reference numbers.

In accordance with my invention, nitrifying organisms which are present in the sewage treatment system are cultured and built up in a culture means or tank where organic and ammonia nitrogen of the sewage is fed to them in an environment favorable to their growth, and such cultured organisms are applied as inoculum to the system at or ahead of the biological oxidation means. This basic provision of my invention is illustrated in Fig. 1 wherein raw sewage entering the treatment system through conduit 20 enters a primary clarifier 21 where easily settled solids are removed. The effluent liquid from the primary clarifier 21 passes through a conduit 22 to a biological oxidizing means 23 where, in the case of an activated sludge system, air will be blown through the sewage. In other biological oxidation treatment systems, the means 23 may be a trickling filter in which the sewage is sprayed upon the permitted to pass through a bed of a coarse medium such as broken rock wherein the organic matter is acted upon by nitrifying organisms in the presence of air which is carried into the bed by the sewage material sprayed thereon. In either case, the liquor from the biological oxidizing means 23 passes through a conduit 24 to a secondary clarifier 25 where additional solid matter which can then be settled is removed. The effluent liquid from the secondary clarifier 25 passes through a conduit 26 to a point of disposal.

In accordance with my invention a relatively small portion of the effluent from the system is carried by a conduit 27 to an aerated culture basin or tank 28 into which is brought a relatively small amount of raw sewage diverted through a conduit 29 from the incoming sewage conduit 20. Though the nitrifying organisms in the effluent from the secondary clarifier 25 are in greatly diluted and weakened condition and only a relatively small amount of such effluent is passed through the conduit 27 to the culture means 28, the small amounts of nitrifying organisms delivered to the means 28 are there supplied with nitrogenous matter in the raw sewage delivered through the conduit 29 and supplied with oxygen by aeration whereby a relatively concentrated culture of strongly active nitrifying organisms is produced in the culture means 28. From the means 28, the culture of nitrifying organisms is fed through a conduit 30 as an inoculum to one or more points at or ahead of the biological oxidizing means; for example, to the primary clarifier as illustrated in Fig. 1. However, the inoculum conduit 30 may discharge into the conduit 22 so as to add the inoculum to the sewage just before it enters the trickling filter or other biological oxidizing means 23, or the conduit 30 may discharge into the incoming raw sewage conduit 20 ahead of the primary clarifier. When the inoculum is fed into the raw sewage in the conduit 20 or in the primary clarifier 21, and especially when the time of detention of the sewage in the primary clarifier is considerable, it is advisable to preaerate the incoming sewage as in an aerator 31 to provide an environment favorable for the continued growth and working of the nitrifying organisms.

Figure 2:
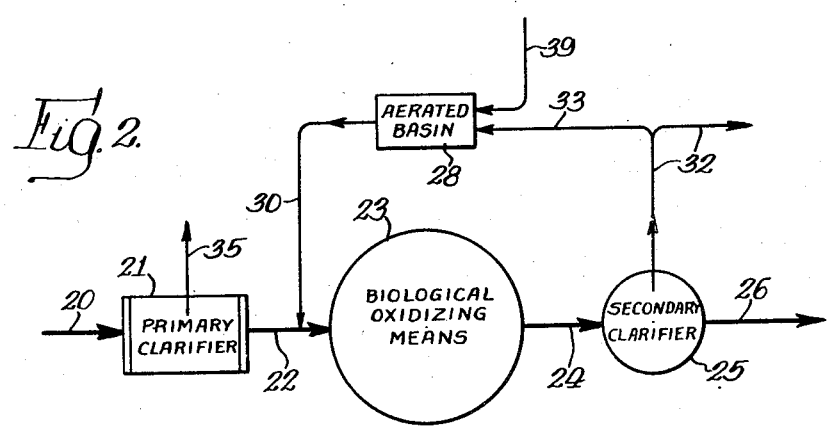

Instead of a portion of the liquid effluent of the system as a supply of nitrifying organisms for the culture means 28, a more concentrated supply of nitrifying organisms may be provided in the form of a portion of the settled sludge from the secondary clarifier 25 as shown in Fig. 2. In the system of Fig. 2 the sludge settled in the secondary clarifier is removed therefrom through the conduit 32 which may carry it to a point of disposal, to a digestion means, to the primary clarifier or, as is normally the practice in the activated sludge process, to the biological oxidizing means 23. A portion of the sludge from the conduit 32 is conducted through the conduit 33 to the aerated culture basin 28.

Figure 3:
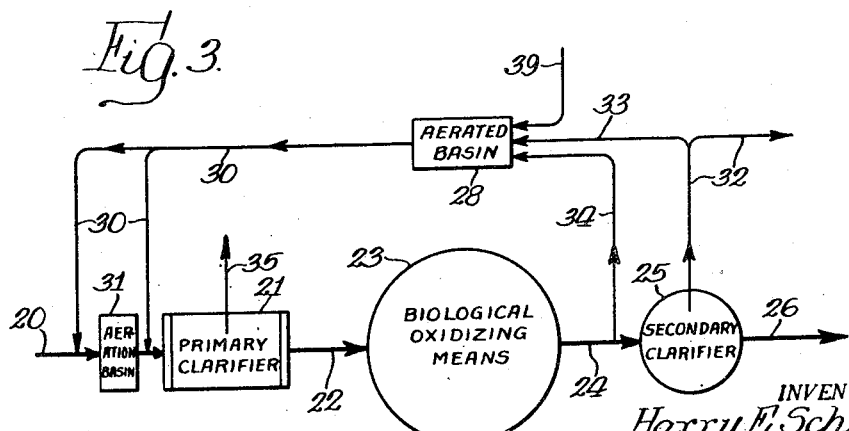

A supply of nitrifying organisms for the culture means 28 may be obtained in the form of a portion of the unsettled effluent from the biological oxidizing means 23 either alone or in combination with a supply in the form of a portion of the settled sludge from the secondary clarifier 25 as in the system of Fig. 3 where the conduit 34 carries a portion of the effluent from the biological oxidizing means 23 to the aerated culture basin 28.

In the system of Fig. 2 the inoculum is fed through the conduit 30 into the inlet to the biological oxidizing means 23 where a sufficient supply of oxygen is maintained to support and promote the activity of the nitrifying organisms. However, in the system of Fig. 3 the inoculum is fed into the sewage ahead of the primary clarifier 21 and an aerator 31 is inserted in the raw sewage inlet conduit 20 to provide the inoculated sewage with sufficient oxygen to maintain the nitrifying organisms in a strong and active condition during the detention of the sewage in the primary clarifier and until the sewage reaches the biological oxidizing means 23.

In Figs. 2 and 3, the conduits 35 carry sludge settled in the primary clarifier to a point of disposal or to a further sludge treatment means.

As my invention is applicable both to processes employing trickling filters and to the activated sludge process, provisions for returning secondary sludge from the secondary clarifier 25 to the biological oxidizing means 23, as required by the normal activated sludge process, have been illustrated in Figures 4 to 11. In Figs. 4, 5, 10 and 11, the secondary sludge is returned to the biological oxidizing means through conduits 36. In Figures 6, 7, 8 and 9, conduits 37 carry sludge from the secondary clarifier 25 back to the raw sewage inlet 20 for resettlement with raw sewage solids and conduits 38 are provided to divert a portion of the returned secondary sludge directly to the biological oxidizing means. However, it should be borne in mind that the various provisions of my invention as illustrated in Figures 4 to 11 are also applicable to systems and processes employing trickling filters and may be applied to such processes and systems in the same manner as they are illustrated as being applied to the systems of Figs. 4 to 11. When employing trickling filters, however, the conduits 36 of Figs. 4, 5, 10 and 11 and the conduits 38 of Figs. 6, 7, 8 and 9 will be unnecessary and may be omitted but the conduits 37 of Figs. 7, 8, and 9 should be retained as they provide the only means in the systems of Figures 7, 8 and 9 to permit the secondary sludge to reach the sludge digesting means by returning it for resettlement in the primary clarifier means.

Instead of or in addition to using raw sewage as a source of nitrogenous food for the nitrifying organisms cultured in the culturing means 28, food in the form of chemicals or food from any desired suitable source may be supplied as through the conduits 39 of Figs. 2, 3 and 4. A portion of the sludge settled in the primary clarifier may be supplied through the conduit 40 of Figure 5 to feed the organisms in the culture means 28.

In sewage treatment systems in which sludge digestion tanks are employed, the disposal of the overflow liquid, sometimes termed supernatant or digester liquor, from such digestion tanks has heretofore constituted a serious problem because of its high biological oxygen demand. However, such liquid from the digestion means having a high ammonia nitrogen content and some organic nitrogen can be very advantageously utilized in accordance with my present invention in such manner that the liquid from the digestion means is rendered beneficial instead of detrimental to the efficient operation of such treatment systems.

Figures 6 to 11 show systems employing sludge digestion tanks 41. In the system of Figure 6, the conduits 35 and 32 carry the sludges from the primary and secondary clarifiers 21 and 25 to the digestion tank 41. A conduit 42 carries digested sludge from the tank 41 to a point of disposal. A conduit 43 carries the liquid from the digester with or without some digested sludge to the culture basin 28 where oxygen is supplied by aeration in sufficient amount to promote growth and activity of the nitrifying organisms feeding on the material supplied from the digestion tank. As considerable nitrifying organisms are present in the material carried to the aerated culture basin 28 through the conduit 43, other supplies of such organisms to the culture basin such as the primary sludge carried by the conduit 44 of Figure 6 the material carried by the conduit 32 or 34 of Figure 3 may be dispensed with. However, other sources may also be employed as, for example, in Figure 7 where the conduit 34 carries a portion of the effluent from the biological oxidizing means 23 with its content of nitrifying organisms to the culture means 28.

The liquid from the digestion means 41 may be employed either without other special sources of food for the nitrifying organisms cultured in the basin 28, as shown in Fig. 7, or may be supplemented from other nitrogenous food sources as, for example, in Fig. 6 where a portion of the sludge settled in the primary clarifier 21 is diverted from the conduit 35 through a conduit 44 to the aerated culture basin 28.

The system of Fig. 8 differs from that of Fig. 7 in that, instead of using a portion of the unsettled effluent from the biological oxidizing means 23 as a source of nitrifying organisms for the culture means 28, a portion of the secondary sludge settled in the clarifier 25 is conducted to the culture means 28 through the conduit 33.

The system of Fig. 9 includes the further provision of a settling basin 45 wherein the sludge in the inoculum from the aerated culture basin 28 is settled out and passed through a conduit 46 to the digestion means 41 so that only the liquid portion of the cultured inoculum high in nitrifying organisms content is passed through the conduit 30 to the point of inoculation of the sewage under treatment.

In the systems of Figures 10 and 11, secondary sludge is carried from the secondary clarifiers 25 through conduits 32 to the sludge digestion tanks 41 so that provisions for returning secondary sludge to the primary clarifiers 21 are not required.

It should be noted that though it is very advantageous to handle the liquor from sludge digestion means by treating in the aerated culture means as shown in Figures 6 to 11, it is not at all necessary to the practice of my invention that such should be done. When desired, the ammonia and remaining organic nitrogen content of a portion of the treated sludge from the digestion tanks 41 may be employed to feed the organisms in the culture means 28 and in such cases the conduits 43 of Figs. 6 to 11 will be used to carry digested sludge instead of or in addition to supernatant liquor from the digestion tanks.

It may be mentioned that another source of nitrogenous matter for feeding the cultured nitrifying organisms which is present and readily available in sewage treatment systems, is the elutrient or wash liquid resulting from washing out of ammonia from digested sludge prior to its disposal on sludge drying beds or prior to the dewatering thereof on vacuum filters. In such elutriation operation relatively clear sewage treatment effluent or plain water is mixed with sludge withdrawn from digestion means for the purpose of washing out the ammonia products therein to make it possible for the sludge matter to be easily dewatered without the use of excessive amounts of chemicals. Such elutrient is normally returned to the sewage process thereby putting an additional load on the biological oxidizing means. By conveying such elutrient to the aerated culture basin or tank 28 of systems embodying my invention as by means of the conduit 39 of Figures 2, 3, and 4, the ammonia nitrogen contained in the elutrient may be utilized to feed the nitrifying organisms being cultured in the basin or tank 28 and at the same time will be so treated and changed in form in the culture means 28 as to avoid the additional loading on the biological oxidizing means which results when such elutrient is fed to the biological oxidizing means as heretofore without prior treatment.

In normal operation the aerated culture basin or tank is preferably operated in a continuous manner with continuous aeration at a rate to secure most efficient operation of the system. The flow of material containing the supply of nitrifying organisms and of food for these organisms into the culture means and the flow of inoculum from the culture means may vary over a wide range. For example, the amount of liquid and/or sludge fed to the culture means from the conduits 24 or 26 or from the secondary clarifier 25 may, depending upon various conditions, amount to from 5% to 15% of the raw sewage flow. The liquid and/or sludge drawn from a sludge digestion means for delivery to the culture means may vary from 10% to 100% of the total liquor displaced from the digestion means. Such 100% utilization of the liquor from the digestion means is entirely practical inasmuch as such liquor has heretofore been returned to the biological means. Subjecting such liquor to aeration and to the action of nitrifying bacteria in the practice of my invention effects a complete change in such liquor so as to reduce the load of matter on the biological oxidizing means.

The aerated culture tank or basin 28 is preferably of a capacity such as normally to provide a holding period therein of about two hours based upon the volume of flow through such culture means. As the amount of material flowing through the culture means is relatively small in comparison to the flow of waste through the main part of the system, the culture tank therefore is relatively small in comparison capacities of the other units in the system. The relatively small flow through the culture means also produces the result that the recirculation in the system is materially reduced as compared with systems not utilizing my invention.

Where there is quite a considerable variation in the quantity and concentration of the waste to be treated, it may sometimes be desirable to operate the culture means on an intermittent discharge basis. However, the matter in the culture tank or basin would be aerated continuously but would be held to be utilized at times when the raw sewage is high in volume or in concentration of putrescible matter so as to require the reserve oxidizing value of the culture material. For example, if the culture is held in the culturing means say for sixteen hours, the concentration of nitrates therein is greatly increased making available, when the cultured material is supplied to the sewage in process, the equivalent of an enormous volume of air in the biological oxidizing means. In fact, the oxygen of the nitrates thus made available makes possible a higher rate of oxidation than can be achieved in practice by additional aeration. Normally in the case of an activated sludge process, when a waste high in volume and biological demand is received, the oxygen put into the waste by means of an activated sludge process is not sufficient to provide complete stability so that as a result effective treatment is not secured. It is at times of such peak flows or concentrations that the great amounts of nitrate material from the culture means together with the great amounts of nitrifying organisms would be most beneficial in minimizing variations in the degree of treatment of the sewage and also in maintaining the concentration of activated sludge in the system. Similar results are also obtained in systems employing the trickling-filtering type of biological oxidizing means. It is, therefore, found to be quite advantageous to provide, in some cases, aerated culture basins or tanks of capacity large enough for maintaining therein volumes of material to be used in amounts required to balance peak biological oxidation requirements of the incoming sewage. The nitrates thus built up in the culture means permit greater rates of biological oxidation than can be practically provided by aeration.

In practical operation with intermittent flow from the culture means, when a heavy draft is made on the culture means it would be desirable not to deplete the supply of material in the culture means completely. Some of the nitrifying organisms and matter in the culture means should be retained to aid in building up a further supply of cultured material. The capacity of the culture tank or basin for such intermittent discharge operation should be such as will allow withdrawal of sufficient cultured material to take care of peak load conditions by withdrawing not more than about 70% of the material in the culture means. During the time when the cultured material is not required by the biological oxidizing means, the supply of nitrifying organisms from the liquid and/or sludge obtained from a point following the biological oxidizing means would be fed to culture means at a continuous rate and the nitrogenous material to feed the organisms would be added at an optimum continuous rate so that the culture tank would gradually fill to capacity and would be aerated for a reasonable period of time, say a minimum of six hours, before the next withdrawal of a charge of material therefrom.

It is found that by the use of the cultured inoculum in accordance with the present invention as herein before described, the destruction of solids is very greatly increased over and above the destruction of solids heretofore obtained in other treatment systems and processes. By destruction of solids is meant conversion thereof into liquids and/or gasses, resulting in a very great reduction of the solids to be handled and eventually disposed of.

I claim:

1. The method of treating sewage which comprises subjecting raw sewage to primary clarification, subjecting the clarified sewage to trickling filter treatment, subjecting the filtered material to secondary clarification, segregating at least a portion of the material in process containing nitrifying organisms after it has been subjected to the trickling filter treatment, the quantity of such segregated material being equal to not more than 15% of the volume of flow of raw sewage, continuously supplying such segregated material with both oxygen and nitrogenous food for a period sufficient to induce rapid growth of such organisms, continuously returning cultured material rich in nitrifying organisms from said segregated material directly to the main flow of sewage, at a point prior to said trickling filter treatment and in substantially the same condition and quantity as it leaves the segregated material, to render said returned nitrifying organisms available to the material in process during the trickling filter treatment, subjecting all cultured material removed from said segregated material to said trickling filter treatment prior to the time that it or any admixture thereof with any other material is returned to the segregated material and discharging the effluent from the secondary clarification to a point of disposal.

2. The method of treating sewage which comprises subjecting raw sewage to primary clarification, subjecting the clarified sewage to trickling filter treatment, subjecting the filtered material to secondary clarification, segregating at least a portion of the sludge from the secondary clarification containing nitrifying organisms, the quantity of such segregated material being equal to not more than 15% of the volume of flow of raw sewage, continuously supplying such segregated material with both oxygen and digester material for a period sufficient to induce rapid growth of such organisms, continuously returning cultured material rich in nitrifying organisms from said segregated material directly to the main flow of sewage in process, at a point after the primary clarification but prior to said trickling filter treatment and in substantially the same condition and quantity as it leaves the segregated material to render said returned nitrifying organisms available to the material in process during the trickling filter treatment, subjecting all cultured material removed from said segregated material to said trickling filter treatment prior to the time that it or any admixture thereof with any other material is returned to the segregated material and discharging the effluent from the secondary clarification to a point of disposal.

3. The method of treating sewage which comprises subjecting raw sewage to primary clarification, subjecting the clarified sewage to trickling filter treatment, subjecting the filtered material to secondary clarification, segregating at least a portion of the effluent from the secondary clarification containing nitrifying organisms, the quantity of such segregated material being equal to not more than 15% of the volume of flow of raw sewage, continuously supplying such segregated material with both oxygen and raw sewage for a period sufficient to induce rapid growth of such organisms, continuously returning cultured material rich in nitrifying organisms from said segregated material directly to the main flow of sewage in process, at a point prior to said trickling filter treatment and in substantially the same condition and quantity as it leaves the segregated material to render said returned nitrifying organisms available to the material in process during the trickling filter treatment, subjecting all cultured material removed from said segregated material to said trickling filter treatment prior to the time that it or any admixture thereof with any other material is returned to the segregated material and discharging the effluent from the secondary clarification to a point of disposal.

4. The method of treating sewage which comprises subjecting raw sewage to primary clarification, subjecting the clarified sewage to trickling filter treatment, subjecting the filtered material to secondary clarification, segregating at least a portion of the effluent from the trickling filter treatment containing nitrifying organisms, the quantity of such segregated material being equal to not more than 15% of the volume of flow of raw sewage, continuously supplying such segregated material with both oxygen and nitrogenous food for a period sufficient to induce rapid growth of such organisms, continuously returning cultured material rich in nitrifying organisms from said segregated material directly to the main flow of sewage in process, at a point prior to said trickling filter treatment and in substantially the same condition and quantity as it leaves the segregated material to render said returned nitrifying organisms available to the material in process during the trickling filter treatment, subjecting all cultured material removed from said segregated material to said trickling filter treatment prior to the time that it or any admixture thereof with any other material is returned to the segregated material and discharging the effluent from the secondary clarification to a point of disposal.

5. The method of treating sewage which comprises subjecting raw sewage to primary clarification, subjecting the clarified sewage to trickling filter treatment, subjecting the filtered material to secondary clarification, segregating at least a portion of the sludge from the secondary clarification containing nitrifying organisms, the quantity of such segregated material being equal to not more than 15% of the volume of flow of raw sewage, continuously supplying such segregated material with both oxygen and sludge from the primary clarification for a period sufficient to induce rapid growth of such organisms, continuously returning cultured material rich in nitrifying organisms from said segregated material directly to the main flow of sewage in process, at a point after the primary clarification but prior to said trickling filter treatment and in substantially the same condition and quantity as it leaves the segregated material, to render such returned nitrifying organisms available to the material in process during the trickling filter treatment, subjecting all cultured material removed from said segregated material to said trickling filter treatment prior to the time that it or any admixture thereof with any other material is returned to the segregated material and discharging the effluent from the secondary clarification to a point of disposal.

6. The method of treating sewage which comprises subjecting raw sewage to primary clarification, subjecting the clarified sewage to trickling filter treatment, subjecting the filtered material to secondary clarification, segregating at least a portion of the sludge from the secondary clarification containing nitrifying organisms, the quantity of such segregated material being equal to not more than 15% of the volume of flow of raw sewage, continuously supplying such segregated material with both oxygen and digester material for a period sufficient to induce rapid growth of such organisms, continuously returning cultured material rich in nitrifying organisms from said segregated material directly to the main flow of sewage in process, at a point prior to said trickling filter treatment and in substantially the same condition and quantity as it leaves the segregated material, to render such returned nitrifying organisms available to the material in process during the trickling filter treatment, returning the remaining portion of the sludge from the secondary clarification to the main flow of sewage in process at a point prior to the primary clarification, subjecting all cultured material removed from said segregated material to said trickling filter treatment prior to the time that it or any admixture thereof with any other material is returned to the segregated material and discharging the effluent from the secondary clarification to a point of disposal.

7. The method of treating sewage which comprises subjecting raw sewage to primary clarification, subjecting the clarified sewage to trickling filter treatment, subjecting the filtered material to secondary clarification, segregating at least a portion of the material in process containing nitrifying organisms, supplying such segregated material with both oxygen and raw sewage for a period sufficient to induce rapid growth of such organisms, returning cultured material rich in nitrifying organisms from said segregated material directly to the main flow of sewage in process, at a point prior to said trickling filter treatment and in substantially the same condition and quantity as it leaves the segregated material to render said returned nitrifying organisms available to the material in process during the trickling filter treatment, and discharging the effluent from the secondary clarification to a point of disposal.

8. The method of treating sewage which comprises subjecting raw sewage to primary clarification, subjecting the clarified sewage to trickling filter treatment, subjecting the filtered material to secondary clarification, segregating at least a portion of the effluent from the secondary clarification containing nitrifying organisms, continuously supplying such segregated material with both oxygen and raw sewage for a period sufficient to induce rapid growth of such organisms, continuously returning cultured material rich in nitrifying organisms from said segregated material directly to the main flow of sewage in process, at a point prior to said trickling filter treatment and in substantially the same condition and quantity as it leaves the segregated material to render said returned nitrifying organisms available to the material in process during the trickling filter treatment, and discharging the effluent from the secondary clarification to a point of disposal.

HARRY E. SCHLENZ.

REFERENCES CITED

The following references are of record in the file of this patent:

UNITED STATES PATENTS

| Number | Name | Date |
|---|---|---|
| 1,904,916 | Coombs | Apr. 18, 1933 |
| 1,982,246 | Fischer | Nov. 27, 1934 |
| 2,027,370 | Currie | Jan. 14, 1936 |
| 2,065,123 | Downes | Dec. 22, 1936 |
| 2,089,162 | Goudey et al. | Aug. 3, 1937 |
| 2,118,266 | Nordell | May 24, 1938 |
| 2,154,132 | Mallory | Apr. 11, 1939 |
| 2,196,840 | Singleton | Apr. 9, 1940 |
| 2,228,017 | Pecker | Jan. 7, 1941 |
| 2,254,953 | Thomas | Sept. 2, 1941 |
| 2,258,398 | Ward | Oct. 7, 1941 |
| 2,317,782 | Levine | Apr. 27, 1943 |
| 2,337,507 | Thayer | Dec. 21, 1943 |
| 2,348,126 | Green | May 2, 1944 |
| 2,349,390 | Tolman | May 23, 1944 |
| 2,359,004 | Schlenz et al. | Sept. 26, 1944 |
| 2,363,176 | Gunz | Nov. 21, 1944 |
| 2,366,917 | Levine | Jan. 9, 1945 |
| 2,374,772 | Nordell | May 1, 1945 |
| 2,388,795 | Montgomery et al. | Nov. 13, 1945 |
| 2,391,494 | Walker | Dec. 25, 1945 |
| 2,404,223 | Durdin, 3d | July 16, 1946 |
| 2,419,492 | Green | Apr. 22, 1947 |
| 2,517,792 | Kraus | Aug. 8, 1950 |

FOREIGN PATENTS

| Number | Country | Date |
|---|---|---|
| 218,399 | Great Britain | June 27, 1924 |